United States Patent
Edwards et al.

(10) Patent No.: US 10,235,324 B2
(45) Date of Patent: Mar. 19, 2019

(54) INTERCONNECT SHARING WITH INTEGRATED CONTROL FOR REDUCED PINOUT

(71) Applicant: FREESCALE SEMICONDUCTOR, INC., Austin, TX (US)

(72) Inventors: William E. Edwards, Ann Arbor, MI (US); Jesse R. Beeker, Novi, MI (US)

(73) Assignee: NXP USA, Inc., Austin, TX (US)

( * ) Notice: Subject to any disclaimer, the term of this patent is extended or adjusted under 35 U.S.C. 154(b) by 139 days.

(21) Appl. No.: 14/870,770

(22) Filed: Sep. 30, 2015

(65) Prior Publication Data
US 2017/0091139 A1    Mar. 30, 2017

(51) Int. Cl.
| | | |
|---|---|---|
| *G06F 13/16* | (2006.01) | |
| *G06F 13/42* | (2006.01) | |
| *G06F 13/40* | (2006.01) | |
| *G06F 13/24* | (2006.01) | |

(52) U.S. Cl.
CPC .......... *G06F 13/4282* (2013.01); *G06F 13/16* (2013.01); *G06F 13/24* (2013.01); *G06F 13/4027* (2013.01)

(58) Field of Classification Search
CPC .......... G06F 13/16; G06F 13/24; G06F 13/40; G06F 13/42
See application file for complete search history.

(56) References Cited

U.S. PATENT DOCUMENTS

| | | | | |
|---|---|---|---|---|
| 6,016,525 A * | 1/2000 | Corrigan | ............ | G06F 11/2221 710/100 |
| 6,769,101 B2 * | 7/2004 | Stong | ............... | G01R 31/31858 324/762.02 |
| 9,696,789 B2 * | 7/2017 | Ahmad | ................. | G06F 1/3287 |
| 2003/0147459 A1 * | 8/2003 | Ryter | ................... | H04B 1/0003 375/219 |
| 2006/0143348 A1 * | 6/2006 | Wilson | ................ | G06F 13/4291 710/110 |
| 2009/0030535 A1 * | 1/2009 | Yang | ........................ | G06F 3/16 700/94 |
| 2009/0116475 A1 * | 5/2009 | Krzyzanowski | ........ | G06F 15/16 370/352 |
| 2013/0266154 A1 * | 10/2013 | McCormack | ............ | H04R 3/00 381/117 |
| 2014/0039649 A1 * | 2/2014 | Wender | ................ | G05B 19/406 700/81 |
| 2014/0136744 A1 * | 5/2014 | Song | ........................ | G06F 13/24 710/267 |

(Continued)

Primary Examiner — Henry Tsai
Assistant Examiner — Christopher A. Daley (57) ABSTRACT

A method and apparatus provide an ability to selectively couple one of the output of the buffer or the output of the digital driver to a data terminal based upon a state of a storage location in which a stored first select indicator is stored and based upon a state of a selection signal. An external serial interface, at a semiconductor die, includes the data terminal, a selection terminal to receive the selection signal, and a clock terminal to receive a clock signal. A buffer includes an input to receive a secondary signal and an output to provide the secondary signal to the data terminal. A digital driver includes a digital output coupled to the data terminal. A first storage location has a storage state based upon the stored first select indicator. Select circuitry provides the selectively coupling.

20 Claims, 3 Drawing Sheets

(56) References Cited

U.S. PATENT DOCUMENTS

| | | | |
|---|---|---|---|
| 2015/0194992 A1* | 7/2015 | Rasbornig | H04B 1/16 375/316 |
| 2016/0182054 A1* | 6/2016 | Westwick | H03K 19/17728 326/38 |
| 2016/0350240 A1* | 12/2016 | Grafton | G06F 13/4282 |
| 2017/0184539 A1* | 6/2017 | Chandrasekhar | G01N 27/416 |

* cited by examiner

INTERCONNECT SHARING WITH INTEGRATED CONTROL FOR REDUCED PINOUT

BACKGROUND

Field of the Disclosure

The present application relates generally to electronic devices and more specifically to interconnect utilization of integrated circuits.

Background of the Disclosure

Integrated circuit (IC) devices, such as a semiconductor die or a packaged device including one or more semiconductor die, can be generally characterized as having external support pins, such as Vdd and GND pins, and external functional pins through which information is communicated to implement a desired operation. Reducing the number of external pins of an IC device for a given functionality is desirable in that doing so can reduce the overall cost of the device.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

An IC device includes a serial interface, such as a Serial Peripheral Interface (SPI), through which digital data can be serially provided to a data pin of the serial interface, such as a Master In Slave Out (MISO) pin of a SPI when the SPI interface of the IC device is operating in a slave mode. The IC device is configurable so that either a serial digital signal can be provided to the data pin, in accordance with a specific serial protocol, or alternatively a secondary signal can be provided to the data pin of the bus. The secondary signal is a signal that carries information in some form, for example, an analog form or a digital form, which can include, for example, a pulse width modulated (PWM) form. According to an embodiment, a command received at the serial interface of the IC device determines whether the data pin of the IC device transmits (1) serial digital data, (2) analog data, or (3) mixed signal data (analog and digital) time multiplexed according to selection by a select line. For example, a write command to write a specific value to a register field of the IC device can be received at the SPI of the IC device, wherein the specific value indicates whether analog data is to be provided to the data pin. Thus, the data pin can be time multiplexed to transmit either digital information serially according to a specific protocol, or to transmit analog information. Specific embodiments of the present disclosure will be better understood with reference to FIGS. 1 through 5.

Figure 1:
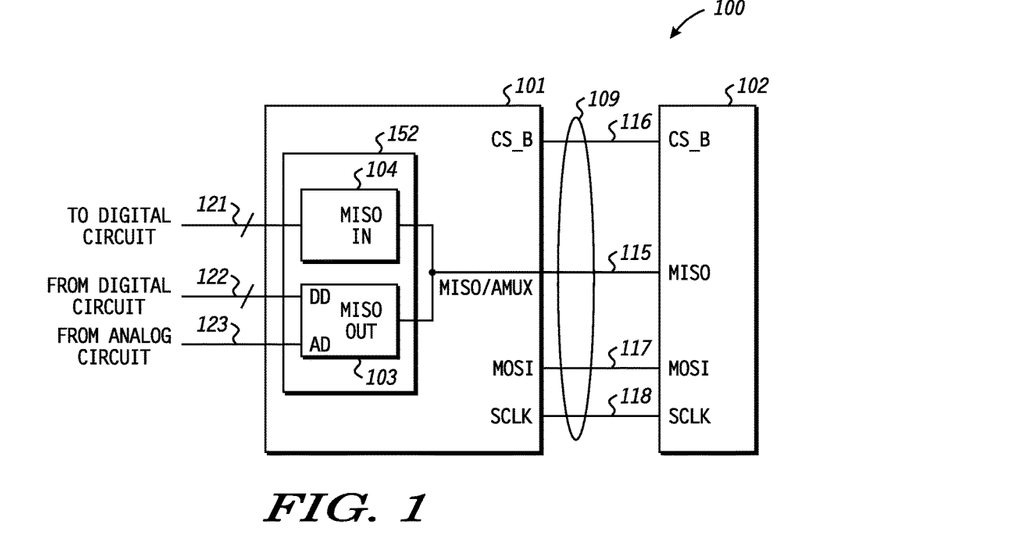
FIG. 1 is a block diagram illustrating a system in accordance with at least on embodiment of the present disclosure.

FIG. 1 is a block diagram illustrating a system 100 comprising a semiconductor die 101 and a semiconductor die 102. As examples, semiconductor dies 101 and 102 may be devices such as data processors (e.g., microprocessors, special purpose processors, microcontrollers, etc.), peripheral ICs (e.g., sensor ICs, switch multiplexer ICs, communication ICs, etc.), or other types of semiconductor dies. Semiconductor die 101 and semiconductor die 102 may, but need not be, the same type of device. Semiconductor die 101 and semiconductor die 102 can serve in different roles. As an example that will be described in more detail below, semiconductor die 101 can serve as a slave device and semiconductor die 102 can serve as a master device, although other combinations of roles are also possible. Each semiconductor die can represent a die or a packaged device having a serial interface through which information is serially transmitted. The serial interface includes a plurality of external terminals that may themselves be pins, pads, solder balls, solder bumps, or other conductive structures. The serial interface of semiconductor die 101 is connected to the serial interface of semiconductor die 102 via a serial interconnect bus 109. By way of example, the serial interface of semiconductor die 101 is presumed to be a SPI having pins CS_B, MOSI, MISO/AMUX and SCLK, wherein pin MISO/AMUX can selectively operate as a normal MISO pin or to provide an analog output signal. The serial interface of semiconductor die 102 is presumed to be a SPI having pins CS_B, MOSI, MISO and SCLK. FIG. 1 shows CS_B pin 116, MISO/AMUX pin 115 (which is connected to the MISO pin of semiconductor die 102), MOSI pin 117, and SCLK pin 118 of semiconductor die 101 conveying signals along conductors of serial interconnect bus 109.

Semiconductor die 101 includes serial interface circuitry 152 that controls operation of a serial interface. By way of example, it is presumed the serial interface circuitry 152 can implement digital communications using the well known SPI interface when operating in a normal digital mode of operation. In addition, the serial interface circuitry 152 can communicate analog information over an interconnect of the serial interface when operating in an alternate mode of operation.

For an embodiment in which semiconductor die 101 can operate in either a master mode or a slave mode with respect to serial interface bus 109, serial interface circuitry 152 includes a block 104, labeled MISO_IN, and a block 103, labeled MISO_OUT. Block 104 represents circuitry that is used to receive digital information serially from terminal MISO/AMUX when semiconductor die 101 is operating as the master of the serial interface bus 109. The received information is provided to bus 121, which is coupled to an input of block 104. Block 103 represents circuitry that can selectively provide either digital or analog information to terminal MISO/AMUX depending upon a particular mode of operation. When in slave mode during normal digital mode of operation, circuitry of block 103 provides digital information serially to terminal MISO/AMUX from bus 122. When operating in an alternate mode of operation circuitry of block 103 provides an analog signal to terminal MISO/AMUX from bus 123. In the following description, for clarity, semiconductor die 101 will be presumed to be in the slave mode, and semiconductor die 102 will be presumed to be in the master mode, although the opposite configuration is alternatively possible. The IC device in the master mode (e.g., semiconductor die 102) asserts and negates the chip select bar (CS_B) signal at the CS_B terminal, and the IC device in the slave mode (e.g., semiconductor die 101) receives the CS_B signal at the CS_B terminal and, when CS_B is asserted, recognizes that the IC device in the master mode intends to establish communication over the serial interface. While IC devices 101 and 102 are described as being capable of operating in either a master mode or a slave mode, it will be appreciated that embodiments may be implemented with IC devices that are dedicated to operating in only one of the master mode and the slave mode, for example, with semiconductor die 101 being dedicated to operating in the slave mode and semiconductor die 102 being dedicated to operating in the master mode.

According to an embodiment, when the serial interface is enabled, e.g. CS_B is asserted, and semiconductor die 101 is configured as a slave of the serial bus 109, one of serial digital data or analog data is provided by block 103 to terminal MISO/AMUX for communication to semiconductor die 102. According to another embodiment, when the serial interface is enabled only digital serial data is provided to terminal MISO/MUX during slave mode of operation, and analog data can be selectively provided to terminal MISO/MUX only when the serial interface is disabled. Various embodiments of the present disclosure will be better understood with reference to FIGS. 2-5.

Figure 2:
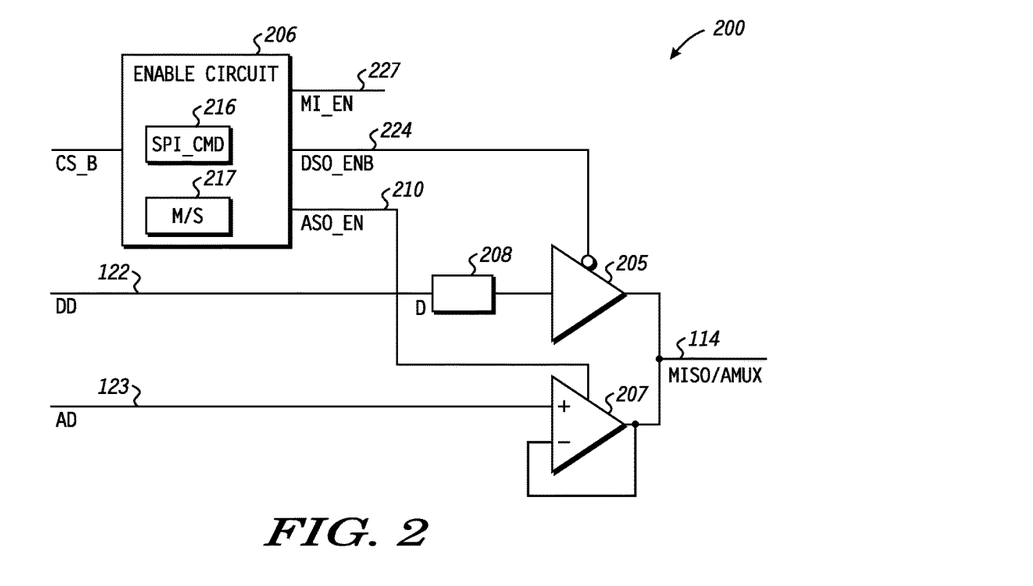
FIG. 2 is a block diagram illustrating a portion of the system FIG. 1 in greater detail in accordance with at least one embodiment.

FIG. 2 illustrates a block 200 that is a particular embodiment of a portion the serial interface circuitry 152 that can selectively provide either serial digital information or analog information to the MISO/AMUX pin when the signal received at input CS_B is enabled. In particular, block 200 includes serial data out buffer 205, analog buffer 207, and parallel-to-serial digital data converter 208, which can be portions of a specific embodiment of MISO_OUT 103, and an enable block 206. Serial data out buffer 205 is a digital buffer that includes an output connected to MISO/AMUX terminal 114, an input connected to interconnect 209, and an active-low enable input connected to interconnect 224. The output of serial data out buffer 205 is a tristate output, which allows serial data out buffer 205 to be placed in a high impedance output mode, allowing analog buffer 207 to drive MISO/AMUX terminal 114 without contention. MISO/AMUX terminal 114 is connected to MISO/AMUX pin 115 of semiconductor die 101. As an example, serial data out buffer 205 may be a tristate buffer being able to drive MISO/AMUX terminal 114 to either a low logic level or a high logic level when enabled or to place its output in a high-impedance state to avoid driving MISO/AMUX terminal 114 to any particular logic level or voltage when disabled, wherein the enablement and disablement of the tristate buffer is controlled by the DSO_ENB signal at the active-low enable input connected to interconnect 224. Parallel-to-serial digital data converter 208 has an input connected to bus 122, and an output connected to interconnect 209. The analog buffer 207 is configured as a unity gain differential buffer that includes an output connected to terminal MISO/AMUX, a positive input connected to terminal 123, a negative input connected to MISO/AMUX, e.g., connected to the output of analog buffer 207, and an enable input connected to interconnect 110. The output of analog buffer 207 is a tristate output, which allows analog buffer 207 to be placed in a high impedance output mode, allowing serial data out buffer 205 to drive MISO/AMUX terminal 114 without contention.

Enable circuit 206 includes an input connected to the terminal CS_B, an output connected to interconnect 224 to provide signal DSO_EN, an output connected to interconnect 225 to provide signal ASO_EN, and an output connected to interconnect 227 to provide signal MI_EN. In addition, enable circuit 206 includes a storage location 216 where a value SPI_CMD is stored, and a storage location 217 where a value M/SB is stored. The storage locations are presumed to be register fields where the values can be stored. The storage location 216 is presumed to be a register that can be written to by a command sent to semiconductor die 101 from semiconductor die 102 over the serial interconnect bus 109. For example, a write command that includes an operand and a register identifier, such as an address, that corresponds to can store the operand at storage location 216 as represented by SPI_CMD.

During a particular embodiment, the enable circuit 206 determines whether the semiconductor die 101 is operating as a slave or master with respect to the serial interface bus 109 when signal CS_B is asserted, and, when operating in slave mode, further determines whether the serial interface bus is to provide a digital or analog signal. For example, the enable circuit 206 can operate as indicated by following Truth Table 1:

TRUTH TABLE 1

| INPUTS | | | ENABLE CIRCUIT OUTPUTS | | |
|---|---|---|---|---|---|
| | | SPI_CMD | | | |
| CS_B | M/S | (D/A) | MI_EN | DSO_EN | ASO_EN |
| NEGATE | X | X | NEGATE | NEGATE | NEGATE |
| ASSERT | M | X | ASSERT | NEGATE | NEGATE |
| ASSERT | S | D | NEGATE | ASSERT | NEGATE |
| ASSERT | S | A | NEGATE | NEGATE | ASSERT |

Thus, according to Truth Table 1, when the serial interface of semiconductor die 101 is not enabled, as indicated in the truth table as when signal CS_B is negated, each one of the signals MI_EN, DSI_EN, and ASO_EN are also negated, thereby disabling operation of block 104, and block 103. For ease of discussion, it is presumed that when block 103 is disabled, e.g., CS_B is negated, that serial data out buffer 205 and analog buffer 207 are placed in a high-impedance states, e.g., the MISO/AMUX terminal is tri-stated.

When signal CS_B is asserted, which indicates the serial interface of semiconductor die 101 is enabled, and the state of M/S, at storage location 217, corresponds to "M", which indicates that the serial interface of semiconductor die 101 is master of the serial interface bus 109, the enable circuit 206 asserts signal MI_EN to allow the block 204 to receive serially transmit digital data from terminal MISO/AMUX. For example, a bit of data at terminal MISO provided by semiconductor die 102 can be latched at semiconductor die 101 by block 104 in response to transitions of the clock signal received at terminal SCLK, which can also be provided by semiconductor die 102. During this configuration of the serial interface, the signals DSO_EN and ASO_EN are negated to prevent operation of block 103. For example, DSO_EN is negated to place the digital buffer 205 in a high-impedance state, and the signal ASO_EN is negated to place analog buffer 207 in a high-impedance state.

When signal CS_B is asserted and the state of M/S, at storage location 217, is "S", which indicates that the serial interface is a slave of the serial interface bus 109, the enable circuit 206 negates signal MI_EN and enables one of ASO_EN or DSO_EN. If the state of CPI_CMD is the "D" indicator, the signal DSO_EN is asserted so that serial data out buffer 205 is enabled to transmit serial data to the terminal MISO/AMUX and the analog buffer 207 is tristated. If the state of SPI_CMD is the "A" indicator, the signal ASO_EN is asserted so that analog buffer 207 is enabled to transmit an analog signal at interconnect 123 to terminal MISO/AMUX, and the digital buffer 205 is tristated. Note that in the present embodiment, digital data can continue to be serially received at terminal MOSI irrespective as to whether analog or digital communications are being provided by terminal MISO.

According to an alternate embodiment, the enable circuit 206 can operate to transmit analog data only when the serial interface is disabled, as indicated by following Truth Table 2:

TRUTH TABLE 2

| INPUTS | | | MISO ENABLE SIGNALS | | |
|---|---|---|---|---|---|
| CS_B | M/SB | SPI_CMD (D/AB) | MI_EN | XDS0_EN | ASO_EN |
| NEGATE | X | A | NEGATE | NEGATE | ASSERT |
| NEGATE | X | D | NEGATE | NEGATE | NEGATE |
| ASSERT | M | X | ASSERT | NEGATE | NEGATE |
| ASSERT | SB | X | NEGATE | ASSERT | NEGATE |

According to Truth Table 2, when the serial interface of semiconductor die 101 is enabled, the serial interface circuitry 152 operates to transmit data in a normal manner, e.g., according to the SPI specification. Thus, when the state of M/S at storage location 217 corresponds to M, the signal MI_EN is asserted to enable operation of the circuitry MISO_IN 104, and signals DSO_EN and ASO_EN are negated to disable operation of the circuitry MISO_OUT 103. Conversely, when the state of M/S at storage location 217 corresponds to S, the signal MI_EN is negated to disable the circuitry MISO_IN 104, the signal DSO_EN is asserted to enable transmission of serial data, and the signal ASO_EN is negated to prevent the transmission of analog data.

When CS_B is negated normal SPI operation is disabled and the state of the SPI_CMD storage location is used to selectively enable transmission of an analog signal at terminal MISO/AMUX. In particular, if the state of the SPI_CMD storage location indicates analog data is to be transmitted, e.g., as indicated by a value "A" in Truth Table 2, the analog buffer is enabled, even though the serial interface is disabled for digital communication by the CS_B terminal being negated. Note that according to a particular embodiment, the terminal MOSI terminal does not capture when CS_B is negated, which his consistent with the SPI protocol.

It will be appreciated that there are many possible ways to implement enable circuitry 206, including implementations that can be readily determined by providing the truth table to a circuit design synthesis tool that can determine a particular circuitry implementing the desired logic.

Figure 3:
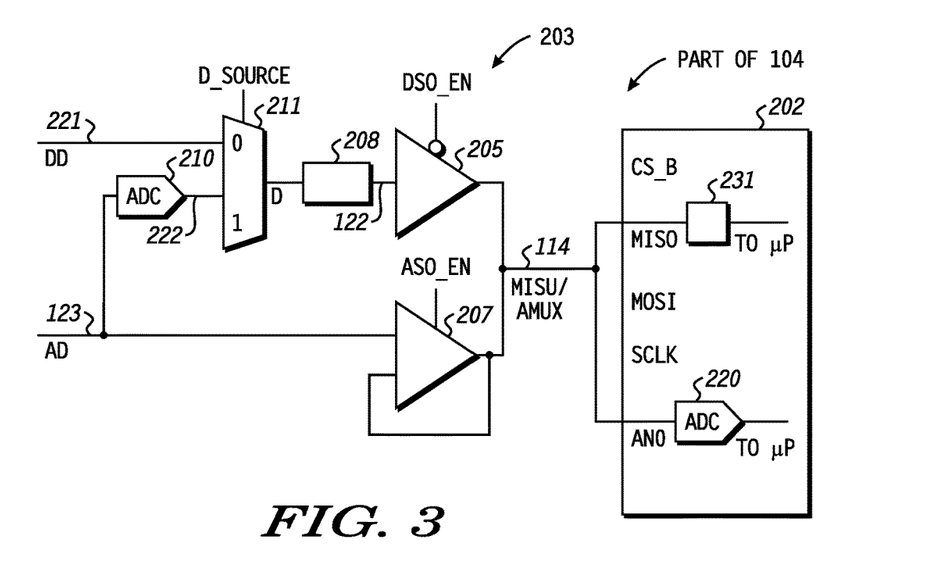
FIG. 3 is a block diagram illustrating a portion of the system of FIG. 1 in accordance with at least one embodiment.

FIG. 3 illustrates a portion 203 of an alternate embodiment of block 103 that can provide either digital information from bus 221 to be serially transmitted from terminal MISO/AMUX when in slave mode, or to provide digitized analog information for transmission. Thus, in a particular embodiment, the enable circuitry 206 can include additional circuitry to drive signal D_SOURCE to a logic 1 when digital data is to be transmitted, or to drive signal D_SOURCE to a logic 1 when a digital representation of analog information is to be transmitted. According to an embodiment, the analog signal received at the analog-to-digital converter (ADC) 210 is the same analog signal received at the positive input of the analog buffer 207.

FIG. 3 further illustrates a semiconductor die 202, which is a specific embodiment of semiconductor die 102 that includes an analog input terminal, labelled AN0, and that receives and provides an analog signal to an ADC 220 for conversion. The analog input terminal can be implemented as the same physical interconnect (e.g., integrated circuit package pin) as the terminal MISO of die 202. As an example, a single pin can be multiplexed between being connected to ADC 220 and being connected to serial interface circuitry 231 of die 202. A microcontroller core of die 202 can control the multiplexed connections of the single pin to ADC 220 and to serial interface circuitry 231, for example, in response to execution of instruction code by the microcontroller core. In the illustrated configuration, redundant communication paths are available to provide a digital representation of an analog signal at semiconductor die 101 to semiconductor die 102 for further digital processing. The first of two redundant paths that can provide a digital representation of the analog signal at interconnect 123 to semiconductor die 202 for processing includes interconnect 123 where the analog data is provided at semiconductor die 101, analog buffer 207, terminal MISO/AMUX, bus 109, terminal AN0, and ADC 220. The second redundant path that can provide a digital representation of the analog signal at interconnect 123 to semiconductor die 202 for processing includes interconnect 123, ADC 210, multiplexor 211, interconnect 122, serial data out buffer 205, terminal MISO/AMUX, bus 109, terminal MISO of semiconductor die 202, and serial communication circuitry of portion 203 that receives and presents digital data received at terminal MISO to the semiconductor die 102 for further processing.

Figure 4:
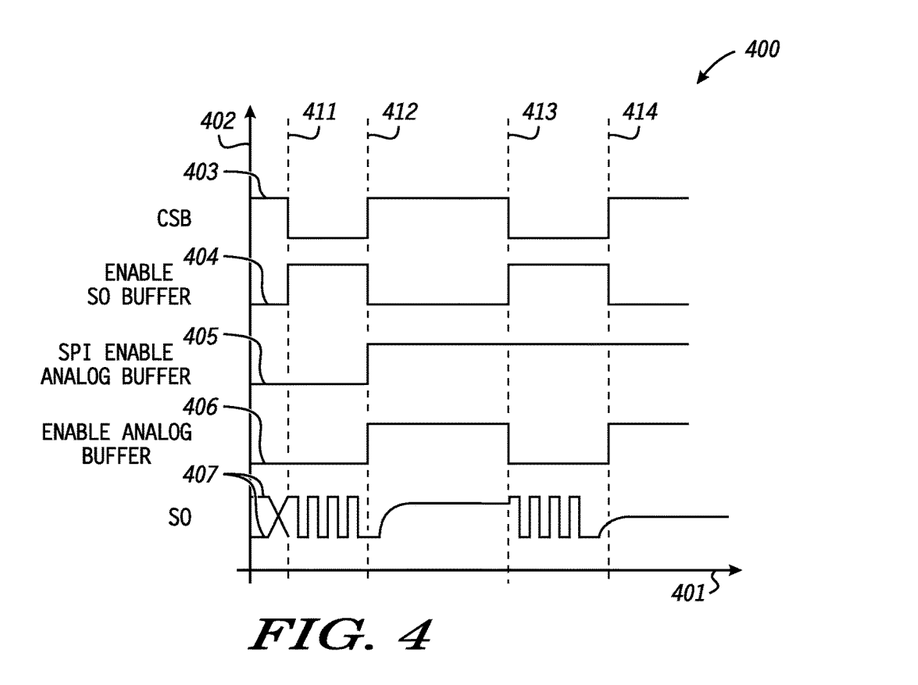
FIG. 4 is a timing diagram illustrating relationships of signals of a system and integrated circuit in accordance with at least one embodiment.

FIG. 4 is a timing diagram illustrating relationships of signals of a system and integrated circuit in accordance with at least one embodiment. Timing diagram 400 is plotted with respect to horizontal axis 401 and vertical axis 402. Timing diagram 400 includes selection signal 403 (e.g., chip select bar signal CSB), enable SO buffer signal 404 (e.g., a chip select signal CS of opposite state from chip select bar signal CSB), SPI enable analog buffer signal 405 (e.g., a signal representing a state of SPI_CMD block 216 of FIG. 2), an enable analog buffer signal 406 (e.g., ASO_EN 210 of FIG. 2), and a MISO/AMUX signal 407 (e.g., a multiplexed digital and analog signal on MISO/AMUX pin 115 of FIG. 1). Initially, as shown at vertical axis 402, selection signal 403 is at a high logic level, enable SO buffer signal 404 is at a low logic level, SPI enable analog buffer signal 405 is at a low logic level, enable analog buffer signal 406 is at low logic level, and MISO/AMUX signal 407 is in an indeterminate state, for example, in a high impedance state, rather than either a digital signal or an analog signal. At time 311, selection signal 403 transitions from a high logic level to a low logic level, enable SO buffer signal 404 transitions from a low logic level to a high logic level, SPI enable analog buffer 405 remains at a low logic level, enable analog buffer signal 406 remains at a low logic level, and MISO/AMUX signal 407 transitions from the indeterminate state to a digital signal, which may transition between low and high logic levels in accordance with data transmitted. At time 412, selection signal 403 transitions from a low logic level to high logic level, enable SO buffer signal 404 transitions from a high logic level to a low logic level, SPI enable analog buffer signal 405 transitions from a low logic level to a high logic level, enable analog buffer signal 406 transitions from a low logic level to a high logic level, and MISO/AMUX signal 407 transitions from a digital signal to an analog signal. Transmission of the analog signal is enabled by the high logic level of SPI enable analog buffer signal 405, which may result, for example, from the receipt of a serial bus command, such as a SPI command, to enable the analog buffer output. At time 413, selection signal 403 transitions from a high logic level to a low logic level, enable SO buffer signal 404 transitions from a low logic level to a high logic level, SPI enable analog buffer 405 remains at a high logic level, enable analog buffer signal 406 transitions from a high logic level to a low logic level, and MISO/AMUX signal 407 transitions from an analog signal to a digital signal. At time 414, selection signal 403 transitions from a low logic level to a high logic level, enable SO buffer signal 404 transitions from a high logic level to a low logic level, SPI enable analog buffer signal 405 remains at a high logic level, enable analog buffer signal 406 transitions from a low logic level to a high logic level, and MISO/AMUX signal 407 transitions from a digital signal to an analog signal.

Figure 5:
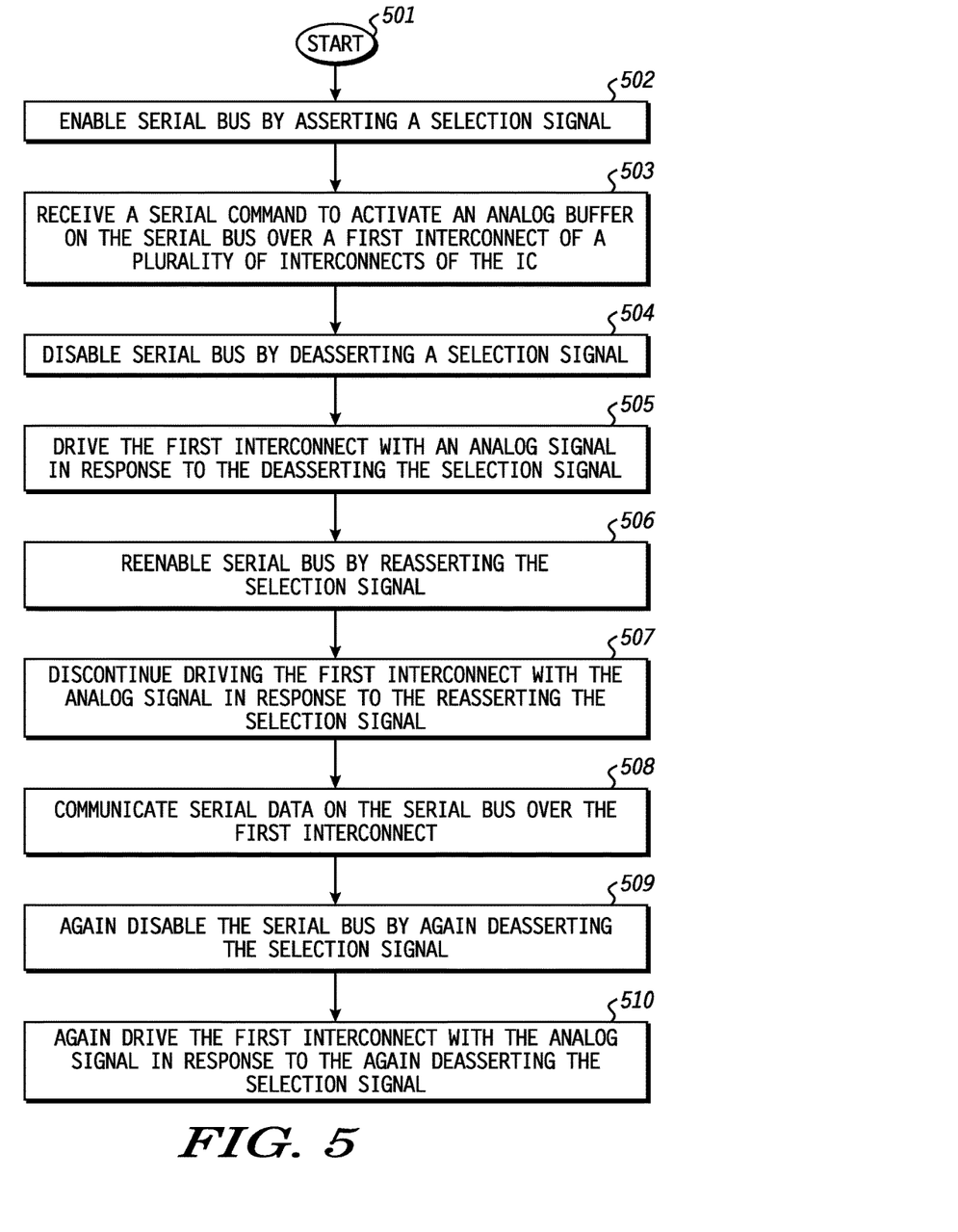
FIG. 5 is a flow diagram illustrating a method in accordance with at least one embodiment.

FIG. 5 is a flow diagram illustrating a method in accordance with at least one embodiment. Method 500 begins at block 501 and continues to block 502. At block 502, the serial bus is enabled by asserting a selection signal. From block 502, method 500 continues to block 503. At block 503, a serial command is received over the serial bus to activate an analog buffer on the serial bus over a first interconnect of a plurality of interconnects of the IC. Since the first interconnect is being used to receive the serial command, the activation of the analog buffer does not necessarily immediately change the type of signal being communicated over the first interconnect. Rather, the serial command prepares the IC for the communication of an analog signal from the analog buffer after the selection signal is deasserted, as will be discussed below. From block 503, method 500 continues to block 504. At block 504, the serial bus is disabled by deasserting the selection signal. From block 504, method 500 continues to block 505. At block 505, the analog buffer drives the first interconnect with the analog signal in response to the deasserting the selection signal. From block 505, method 500 continues to block 506. At block 506, the serial bus is reenabled by reasserting the selection signal. From block 506, method 500 continues to block 507. At block 507, the analog buffer discontinues driving the first interconnect with the analog signal in response to the reasserting the selection signal. From block 507, method 500 continues to block 508. At block 508, serial data is communicated on the serial bus over the first interconnect. From block 508, method 500 continues to block 509. At block 509, the serial bus is again disabled by again deasserting the selection signal. From block 509, method 500 continues to block 510. At block 510, the analog buffer again drives the first interconnect with the analog signal in response to the again deasserting the selection signal. From block 510, method 500 can continue indefinitely in accordance with the states of the signals described herein.

At least one embodiment can be used to increase the number of functional pins versus support pins of an IC. At least one embodiment can allow a low channel count switch detect IC to better compete against discrete solutions for car doors and seat control. At least one embodiment can maximize pin usage and reduce no connects (N/C's), which are unusable interconnects present on an IC package. Note package pin counts are typically not available with any number of pins. Rather, package pin counts tend to be constrained to standard package sizes and also by other considerations. Thus, saving even one pin on a package can make a significant difference in the functionality offered by an IC relative to its form factor. Reducing the pin count of a package or avoiding increasing the pin count of a package while increasing the functionality provided can be of even greater importance in application where small size is important and where a minimal number of electrical interconnects may improve reliability.

In accordance with at least one embodiment, time multiplexing the analog buffer and the SPI Out (e.g., SO or MISO) pin and gating the analog buffer off during SPI communications is provided by using the chip select bar (CSB) signal. An SPI command actives the analog buffer and selects the multiplexer channel to be connected to the analog buffer. The buffer is enabled and drives the SO pin when CSB is inactive (e.g., at a high logic level).

In accordance with at least one embodiment, the functionality of AMUX & SO can be multiplexed onto a single pin. This can avoid the use of two separate pins, the SO pin and the AMUX pin, for a digital serial bus line and an analog signal line, respectively.

In accordance with at least one embodiment, multiplexing an analog output on the SO pin of the SPI is provided, automatically gating the analog signal with CSB so that the analog signal can be continuously monitored except during SPI communications, which can be of a brief, transient nature relative to the presence of the analog signal. In accordance with at least one embodiment, the functional pin count of an IC can be increased and the silicon area can be reduced by not adding an ADC which would be redundant with the ADC of a microprocessor to which the IC is connected by an interconnect. In accordance with at least one embodiment, by adding an ADC to the IC, the ADC of the IC and the ADC of the microprocessor can be used redundantly to convert an analog input signal to a digital form, alternately transmitting a digital representation and an analog representation of the analog input signal over a common electrical interconnect, which can improve reliability.

In accordance with at least one embodiment, an analog multiplexer may be provided at interconnect 123 of portion 203 to allow selection of an analog input signal from among a plurality of analog signals, for example, a plurality of signals present at a plurality of interconnects of an IC package. In accordance with at least one embodiment, an analog multiplexer may be provided at the input of ADC 220 to allow selection of a signal on the MISO/AMUX interconnect among a plurality of other analog signals available for ADC 220 to digitize. While the MISO/AMUX line is shown as connecting two devices, such as two dies, in accordance with at least one embodiment, a serial interface bus connecting more than two devices can include the MISO/AMUX interconnect to convey a signal of the serial interface bus. As an example, a selective enable technique may be used to enable a particular device, such as a particular master device or a particular slave device, to communicate over the serial interface bus.

In accordance with at least one embodiment, a serial interface, such as an SPI, can support communication between a device operating in a master mode and a plurality of devices operating in a slave mode. A selection signal at a selection terminal to which the device operating in the master mode and one of the plurality of devices operating in the slave mode can selectively enable or disable communications, such as serial data communications, between the devices. For example, the device operating in the master mode can assert the selection signal to indicate to the device or devices operating in the slave mode that the device operating in the master mode has enabled communication, such as serial data communication, over the serial interface.

In accordance with at least one embodiment, at a master side (e.g., a device operating in a master mode), two receivers are provided. One receiver receives digital serial data conforming to the serial interface specifications. The other receiver receives a different type of signal. As examples, the different type of signal may be an analog signal, a pulse width modulated (PWM) signal, or a signal conveying digital serial data in a manner that does not conform to the serial interface specifications (e.g., non-SPI serial data). Both receivers are connected to a common interface In the foregoing specification, the invention has been described with reference to specific examples of embodiments of the invention. It will, however, be evident that various modifications, additions, and changes may be made therein without departing from the broader scope of the invention as set forth in the appended claims, and that the claims are not limited to the specific examples described.

For example, an analog multiplexer having an output connected to the analog buffer 207 can receive analog signals from multiple sources, and a register can indicate which one of the analog signal should be provided to the analog buffer 207. The register can be programmed by a write command received at the serial interface.

In another embodiment, it will be appreciated that in other embodiments, more than two IC devices can be the common serial bus, and control logic can be provided to coordinate which devices are in communication with each other.

The term "circuit" refers to electronic components arranged to perform the functions described. The interconnects herein can be implemented as a passive device, such as one or more conductive traces, that transmits information directly between various modules, or as an active device, whereby information being transmitted is buffered, e.g., stored and retrieved, in the processes of being communicated between devices, such as at a first-in first-out memory or other memory device. In addition, a label associated with an interconnect can be used herein to refer to a signal and information transmitted by the interconnect.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well understood elements that are useful or necessary in a commercial feasible embodiment are mostly not depicted in order to facilitate a less abstracted view of these various embodiments of the present invention. It will further be appreciated that certain actions and/or steps in the described method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study except where specific meanings have otherwise be set forth herein.

In accordance with at least one embodiment, a device comprises an external serial interface, a buffer, a digital driver, a first storage location, and select circuitry. The external serial interface, at a semiconductor die, includes a data terminal, a selection terminal to receive a selection signal that selects the device to communicate via the external serial interface, and a clock terminal to receive a clock signal that indicates when digital information is to be provided to the data terminal. The buffer of the semiconductor die includes an input to receive a secondary signal, and an output to provide the secondary signal to the data terminal. The digital driver of the semiconductor die includes a digital output coupled to the data terminal. The first storage location of the semiconductor die has a storage state based upon a stored first select indicator. The select circuitry of the semiconductor die selectively couples one of the output of the buffer or the output of the digital driver to the data terminal based upon a state of a storage location in which the stored first select indicator is stored and based upon a state of the selection signal.

In accordance with at least one embodiment, the semiconductor die is configured to receive a serial command over the serial external interface to store the stored first select indicator at the storage location. In accordance with at least one embodiment, the serial external interface is a Serial Peripheral Interface (SPI). In accordance with at least one embodiment, the data terminal is a Master In Slave Out (MISO) terminal of the SPI. In accordance with at least one embodiment, the analog signal is communicated at all times other than during SPI communications. In accordance with at least one embodiment, the device further comprises an analog-to-digital converter (ADC) having an ADC input to receive the secondary signal and an output selectively coupled to the input of the digital driver to provide a digital representation of the secondary signal for serial transmission at the data terminal, wherein the secondary signal is an analog signal. In accordance with at least one embodiment, the device provides validation of the ADC operation by, at a first time, providing the digital representation of the secondary signal for serial transmission at the data terminal and, at a second time, providing the secondary signal as an analog signal to the data terminal for off-chip data conversion and comparison.

In accordance with at least one embodiment, a method, implemented in an integrated circuit (IC), comprises enabling a serial bus by asserting a selection signal, receiving a serial command on the serial bus over a first interconnect of a plurality of interconnects of the IC, disabling the serial bus by deasserting the selection signal, driving the first interconnect with a secondary information-carrying signal in response to the deasserting the selection signal, reenabling the serial bus by reasserting the selection signal, discontinuing driving the first interconnect with the secondary information-carrying signal in response to the reasserting the selection signal, communicating serial data on the serial bus over the first interconnect, again disabling the serial bus by again deasserting the selection signal, and again driving the first interconnect with the secondary information-carrying signal in response to the again deasserting the selection signal.

In accordance with at least one embodiment, the enabling the serial bus by asserting the selection signal comprises communicating the selection signal over a second interconnect of the plurality of interconnects. In accordance with at least one embodiment, the receiving the serial command on the serial bus over the first interconnect of the plurality of interconnects of the IC comprises receiving the serial command on the serial bus to enable an analog buffer to drive the first interconnect with the secondary information-carrying signal and to select a multiplexer channel of a multiplexer coupled to the analog buffer. In accordance with at least one embodiment, the serial bus is implemented according to a Serial Peripheral Interface (SPI) and wherein the selection signal is communicated on an active-low chip select bar (CSb) line of the SPI. In accordance with at least one embodiment, the serial data is communicated on a slave out (SO) line of the SPI. In accordance with at least one embodiment, the method further comprises receiving a secondary input signal at an analog buffer and at an analog-to-digital converter (ADC), the ADC coupled to the serial bus, and the analog buffer outputting the secondary signal, performing analog-to-digital conversion of the secondary input signal using the analog-to-digital converter (ADC) to provide a digital representation of the secondary input signal, and selectively communicating, over the first interconnect, the secondary signal as an analog representation of the secondary input signal and a portion of the serial data as the digital representation of the secondary input signal. In accordance with at least one embodiment, the selectively communicating, over the first interconnect, the secondary signal as the analog representation of the secondary input signal and the portion of the serial data as the digital representation of the secondary input signal provides redundant communication.

In accordance with at least one embodiment, an integrated circuit (IC) comprises a semiconductor die, a plurality of interconnects, and a package. The semiconductor die comprises a buffer and a serial interface, the serial interface providing a serial bus, the serial bus comprising a data line and a selection line. The plurality of interconnects is coupled to the semiconductor die, the semiconductor die configured to time multiplex, on a first interconnect of the plurality of interconnects, serial data of the data line when the selection line enables the serial bus and a secondary information-carrying signal of the buffer when the selection line disables the serial bus. The package houses the semiconductor die and at least a portion of the plurality of interconnects.

In accordance with at least one embodiment, a second interconnect of the plurality of interconnects is configured to communicate a selection signal of the selection line. In accordance with at least one embodiment, the semiconductor die is configured to receive a serial command over the serial bus to enable the buffer and to select a multiplexer channel of a multiplexer coupled to the buffer. In accordance with at least one embodiment, the serial interface is a Serial Peripheral Interface (SPI), and the selection line is an active-low chip select bar (CSb) line, wherein an output of the buffer is enabled to drive the first interconnect when the CSb line is at a high logic level. In accordance with at least one embodiment, the data line is a slave out (SO) line. In accordance with at least one embodiment, the IC further comprises an analog-to-digital converter (ADC) coupled to the serial interface, the ADC having an ADC input to receive a secondary input signal, the buffer configured to receive the secondary input signal, the IC configured to selectively communicate the secondary signal as an analog representation of the secondary input signal and a portion of the serial data as a digital representation of the secondary input signal.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A device comprising:
an external serial interface, at a semiconductor die, including a data terminal, a selection terminal to receive a selection signal that selects the device to communicate via the external serial interface, and a clock terminal to receive a clock signal that indicates when digital information is to be provided to the data terminal;
a buffer of the semiconductor die including an input to receive a secondary signal, and an output to provide the secondary signal to the data terminal;
a digital driver of the semiconductor die including a digital output to provide a signal to the data terminal;
a first storage location of the semiconductor die to have a storage state based upon a stored first select indicator; and
select circuitry of the semiconductor die to selectively 1) provide the secondary signal from the buffer on the external serial interface via the output of the buffer to the data terminal in response to a first state of a storage location in which the stored first select indicator is stored and in response a first state of the selection signal, and 2) provide the signal from the digital driver on the external serial interface via the output of the digital driver to the data terminal in response to a second state of the storage location in response a second state of the selection signal.

2. The device of claim 1 wherein the semiconductor die is configured to receive a serial command over the serial external interface to store the stored first select indicator at the storage location.

3. The device of claim 1 wherein the serial external interface is a Serial Peripheral Interface (SPI).

4. The device of claim 3 wherein the data terminal is a Master In Slave Out (MISO) terminal of the SPI.

5. The device of claim 3 wherein an analog signal is communicated at all times other than during SPI communications.

6. The device of claim 1 further comprising:
an analog-to-digital converter (ADC) having an ADC input to receive the secondary signal, and an output selectively coupled to the input of the digital driver to provide a digital representation of the secondary signal for serial transmission at the data terminal, wherein the secondary signal is an analog signal.

7. The device of claim 6 wherein the device provides validation of the ADC operation by, at a first time, providing the digital representation of the secondary signal for serial transmission at the data terminal and, at a second time, providing the secondary signal as an analog signal to the data terminal for off-chip data conversion and comparison.

8. A method, implemented in an integrated circuit (IC), comprising:
enabling a serial bus by asserting a selection signal;
receiving a serial command on the serial bus over a first interconnect of a plurality of interconnects of the IC;
enabling an analog buffer to drive the first interconnect;
disabling the serial bus by deasserting the selection signal;
driving the first interconnect with a secondary information-carrying signal from the analog buffer in response to the deasserting the selection signal;
reenabling the serial bus by reasserting the selection signal;
discontinuing driving the first interconnect with the secondary information-carrying signal in response to the reasserting the selection signal;
communicating serial data on the serial bus over the first interconnect;
again disabling the serial bus by again deasserting the selection signal; and
again driving the first interconnect with the secondary information-carrying signal in response to the again deasserting the selection signal.

9. The method of claim 8 wherein the enabling the serial bus by asserting the selection signal comprises:
communicating the selection signal over a second interconnect of the plurality of interconnects.

10. The method of claim 8 wherein the receiving the serial command on the serial bus over the first interconnect of the plurality of interconnects of the IC comprises:
receiving the serial command on the serial bus to enable the analog buffer to drive the first interconnect with the secondary information-carrying signal and to select a multiplexer channel of a multiplexer coupled to the analog buffer.

11. The method of claim 8 wherein the serial bus is implemented according to a Serial Peripheral Interface (SPI) and wherein the selection signal is communicated on an active-low chip select bar (CSb) line of the SPI.

12. The method of claim 11 wherein the serial data is communicated on a slave out (SO) line of the SPI.

13. The method of claim 8 further comprising:
receiving a secondary input signal at the analog buffer and at an analog-to-digital converter (ADC), the ADC coupled to the serial bus, and the analog buffer outputting the secondary signal;
performing analog-to-digital conversion of the secondary input signal using the analog-to-digital converter (ADC) to provide a digital representation of the secondary input signal; and
selectively communicating, over the first interconnect, the secondary signal as an analog representation of the secondary input signal and a portion of the serial data as the digital representation of the secondary input signal.

14. The method of claim 13 wherein the selectively communicating, over the first interconnect, the secondary signal as the analog representation of the secondary input signal and the portion of the serial data as the digital representation of the secondary input signal provides redundant communication.

15. An integrated circuit (IC) comprising:
a semiconductor die, the semiconductor die comprising a buffer and a serial interface, the serial interface providing a serial bus, the serial bus comprising a data line and a selection line;
a plurality of interconnects coupled to the semiconductor die, the semiconductor die configured to time multiplex, on a first interconnect of the plurality of interconnects, serial data of the data line when the selection line enables the serial bus and a secondary information-carrying signal of the buffer when the selection line disables the serial bus; and
a package housing the semiconductor die and at least a portion of the plurality of interconnects.

16. The IC of claim 15 wherein a second interconnect of the plurality of interconnects is configured to communicate a selection signal of the selection line.

17. The IC of claim 15 wherein the semiconductor die is configured to receive a serial command over the serial bus to enable the buffer and to select a multiplexer channel of a multiplexer coupled to the buffer.

18. The IC of claim 15 wherein the serial interface is a Serial Peripheral Interface (SPI) and wherein the selection line is an active-low chip select bar (CSb) line, wherein an output of the buffer is enabled to drive the first interconnect when the CSb line is at a high logic level.

19. The IC of claim 18 wherein the data line is a slave out (SO) line.

20. The IC of claim 15 further comprising:
an analog-to-digital converter (ADC) coupled to the serial interface, the ADC having an ADC input to receive a secondary input signal, the buffer configured to receive the secondary input signal, the IC configured to selectively communicate the secondary signal as an analog representation of the secondary input signal and a portion of the serial data as a digital representation of the secondary input signal.

* * * * *